(12) United States Patent
Hughes

(10) Patent No.: US 6,451,882 B1
(45) Date of Patent: *Sep. 17, 2002

(54) ACRYLONITRILE/STYRENE/ACRYLIC/ FILLER COMPOSITIONS AND METHODS FOR MAKING SAME

(75) Inventor: Roderick E. Hughes, Newport Beach, CA (US)

(73) Assignee: Hughes Processing, Inc., Costa Mesa, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/488,172

(22) Filed: Jan. 20, 2000

Related U.S. Application Data

(63) Continuation-in-part of application No. 09/162,679, filed on Sep. 29, 1998, now Pat. No. 6,133,349, and a continuation-in-part of application No. 08/937,104, filed on Sep. 24, 1997, now Pat. No. 5,883,191.

(51) Int. Cl.⁷ .................. C08L 27/06; C08L 51/00
(52) U.S. Cl. .................. 524/13; 524/504; 524/567
(58) Field of Search ................... 524/13, 504, 567

(56) References Cited

U.S. PATENT DOCUMENTS

| | | |
|---|---|---|
| 3,489,821 A | 1/1970 | Witt et al. |
| 3,642,950 A | 2/1972 | O'Shea |
| 3,711,575 A | 1/1973 | Kakefuda et al. |
| 3,780,140 A | 12/1973 | Hammer |
| 3,944,631 A | 3/1976 | Yu et al. |
| 4,111,876 A | 9/1978 | Bailey et al. |
| 4,248,778 A | 2/1981 | Arnold et al. |
| 4,517,339 A | 5/1985 | Aliberto et al. |
| 4,537,933 A | 8/1985 | Walker et al. |
| 4,576,860 A | 3/1986 | Fink et al. |
| 4,737,532 A * | 4/1988 | Fujita et al. |
| 4,780,506 A | 10/1988 | Wefer |
| 4,831,079 A | 5/1989 | Ting |
| 4,985,497 A | 1/1991 | Kamins et al. |
| 5,086,113 A | 2/1992 | Kamins et al. |
| 5,104,934 A | 4/1992 | Udipi |
| 5,210,134 A | 5/1993 | Akkapeddi et al. |
| 5,814,688 A * | 9/1998 | Hihi et al. |
| 5,814,697 A * | 9/1998 | Akao et al. |
| 5,883,191 A | 3/1999 | Hughes |
| 5,948,524 A * | 9/1999 | Seeehamraju et al. |
| 6,133,349 A * | 10/2000 | Hughes |

FOREIGN PATENT DOCUMENTS

JP         0204049      * 11/1983

\* cited by examiner

Primary Examiner—Tae H. Yoon
(74) Attorney, Agent, or Firm—Stout, Uxa, Buyan & Mullins, LLP; Frank J. Uxa

(57) ABSTRACT

Compositions which have substantial weatherability and impact resistance include a substantially uniform blend of an acrylonitrile/styrene/acrylic polymeric material and a wood component in an amount effective as a filler in the composition. Methods for making such compositions include forming a substantially uniform physical mixture of such polymeric material and wood component.

31 Claims, No Drawings

ACRYLONITRILE/STYRENE/ACRYLIC/FILLER COMPOSITIONS AND METHODS FOR MAKING SAME

RELATED APPLICATION

The present application is a continuation-in-part of co-pending application Ser. No. 09/162,679, filed Sep. 29, 1998 now U.S. Pat No. 6,133,349, which in turn, is a continuation-in-part of application Ser. No. 08/937,104, filed Sep. 24, 1997, now U.S. Pat. No. 5,883,191, the disclosure of each is hereby incorporated, in its entirety, herein by reference.

BACKGROUND OF THE INVENTION

The present invention relates to compositions comprising acrylonitrile/styrene/acrylic ("ASA") polymeric materials and wood, and to methods for making such compositions. More particularly, the present invention relates to compositions comprising ASA polymeric materials and wood which include physical mixtures of ASA polymers and wood and to methods for making such physical mixture-containing compositions.

ASA polymeric materials are known and have been used in various applications which have taken advantage of the weatherability of such materials. As used herein, the term "weatherability" refers to the ability or property of a material to effectively withstand the conditions of an out-of-doors environment over a long period of time, for example, at least five years and preferably at least seven years, with substantially no degradation or decomposition.

ASA polymeric materials that have been taught include, for example, those disclosed in Yu in U.S. Pat. No. 3,994,631, which provides a multi-stage interpenetrating interpolymer. These ASA polymeric materials provide for excellent weatherability. Additionally, Ting U.S. Pat. Nos. 4,731,414 and 4,831,079 and Aliberto et al. U.S. Pat. No. 4,517,339 disclose that other additives may be blended with ASA interpolymers to achieve better optical quality, impact resistance, and fire retardancy. Other patents, for example, Walker et al U.S. Pat. No. 4,537,933 and Morinaga et al, U.S. Pat. No. 4,151,226 disclose ASA polymeric materials including terpolymers, such as styrene acrylonitrile polymers to which are grafted acrylate and/or methacrylate polymers. The disclosure of each of these patents is incorporated in its entirety herein by reference.

Although wood is commonly used as a material of construction because of its strength, look and texture, it has the substantial disadvantage of being not very weatherable. None of the above-noted patents even suggest the use of wood in combination with ASA polymeric materials.

It would be advantageous to provide a component having one or more of the aforementioned weatherability properties and a wood-like look and texture for many applications.

SUMMARY OF THE INVENTION

New acrylonitrile/styrene/acrylic polymeric material, wood component-containing compositions and methods for making such compositions have been discovered. The present invention is based on the discovery that acrylonitrile/styrene/acrylic (ASA) polymeric materials, however produced, can be physically blended together with wood in a single step, for example, using methodologies which can be cost effectively practiced to provide ASA polymeric material, wood component-containing compositions which have controlled and substantially uniform compositions or make-ups. One advantage of the present invention is that the compositions can be fabricated into products which have a wood-like look and texture, derived at least in part from the wood component included in the compositions. Moreover, the present compositions advantageously have desirable properties, for example, weatherability, strength, flexibility and the like, of the ASA polymeric materials included in the compositions.

In a broad aspect of the present invention, weatherable compositions are provided which comprise an ASA polymeric material and a wood component in an amount effective as a filler in the compositions. The ASA polymeric material preferably is present in an amount in the range of about 30% or about 40% to about 99.5%, more preferably about 60% to about 99%, based on the total weight of the composition. The wood preferably is present in the present weatherable compositions in an amount in a range of about 0.5% to about 60% or about 70%, more preferably about 1% to about 40%, based on the total weight of the composition. Although the wood component may be present in any suitable form, it is preferred that the wood be present as wood particles, such as wood chips, wood flakes, sawdust, wood flour, and the like and mixtures thereof. More preferably, such particles have a size in the range of about 40 to about 200 U.S. mesh, still more preferably, about 50 to about 150 U.S. mesh.

In one embodiment of the present invention, compositions are provided which comprise a substantially uniform blend of an uncrossed-linked acrylonitrile/styrene copolymer, for example, a linear uncross-linked acrylonitrile/styrene copolymer, an acrylate copolymer, such as a cross-linked alkyl acrylate/graft (meth)acrylate copolymer, and filler, for example, wood component particles. Wood is a preferred filler component because it is weatherable and, in addition, may be used to provide an aesthetically pleasing wood-like look and/or texture to the outer surface of the final product, e.g., housing siding, structural members and the like, including the present compositions.

In one particularly useful embodiment of the present invention, weatherable compositions are provided which comprise a substantially uniform blend including (1) a physical mixture of at least about 30% by weight, based on the total weight of the physical mixture, of an uncrossed-linked acrylonitrile/styrene copolymer and at least about 5% by weight, based on the total weight of the physical mixture of a cross-linked alkyl acrylate/graft (meth)acrylate copolymer; and (2) a wood component in an amount effective as a filler in the composition.

Without wishing to limit the invention to any particular theory of operation, it is believed that the uncross-linked (e.g., linear) acrylonitrile/styrene copolymer is substantially miscible or compatible with the (meth)acrylate of the cross-linked alkyl acrylate/graft (meth)acrylate copolymer at effective blending conditions. Thus, during the blending operation, the two copolymer components can be combined with the filler component into a substantially uniform combination even though the cross-linked alkyl acrylate may not be miscible or compatible with the uncross-linked acrylonitrile/styrene copolymer. In other words, the (meth) acrylate appears to mitigate against the incompatibility between the uncross-linked acrylonitrile/styrene copolymer and the cross-linked alkyl acrylate. The cross-linked alkyl acrylate/graft (meth)acrylate copolymer provides the acrylic portion of the present ASA polymeric material, wood-containing compositions and, in addition, facilitates the formation of the present substantially uniform, preferably physical, mixtures of copolymers. Moreover, the crosslinked alkyl acrylate/graft (meth)acrylate copolymer is effective to provide beneficial impact resistance to the present compositions.

In order to avoid component incompatibility, the present compositions preferably are substantially free of cross-linked acrylonitrile/styrene copolymers.

As used herein, the terms "physical blend" or "physical mixture" refers to a composition in which the constituent components are combined or mixed with substantially no chemical bonding, in particular with substantially no covalent chemical bonding between the constituents.

The uncross-linked acrylonitrile/styrene copolymers preferably are present in amounts in a range of about 30% to about 95% by weight of the copolymers present. The crosslinked alkyl acrylate/graft (meth)acrylate copolymers preferably are present in amounts in a range of about 5% to about 70% by weight of the copolymers present.

As noted above, it has been found that ASA polymeric materials, however produced, can be effectively blended with wood components, for example, wood particles, to produce compositions having advantageous properties and/or applications.

For example, one type of ASA polymeric material useful in the present compositions is in the form of one or more interpolymers. Such interpolymers preferably are formed from styrene, acrylonitrile and at least one component selected from the group consisting of acrylates, methacrylates and mixtures thereof. The presently useful interpolymers more preferably comprise a crosslinked alkyl (meth) acrylate polymer, crosslinked styrene acrylonitrile polymer and an uncrosslinked styrene-acrylonitrile polymer. The alkyl acrylate polymer, crosslinked styrene acrylonitrile polymer and uncrosslinked styrene-acrylonitrile polymer may be alternating copolymers, random copolymers or block copolymers. Additionally, the alkyl acrylate polymer may also be a homopolymer. The alkyl (meth)acrylate polymer preferably includes units derived from a material selected from a group consisting of $C_2$–$C_{10}$ alkyl acrylates, $C_8$–$C_{22}$ alkyl (meth)acrylates and mixtures thereof. Furthermore, the crosslinked alkyl acrylate and crosslinked styrene-acrylonitrile may be of the following conformations: branched, network, star, comb, ladder or semiladder.

The presently useful interpolymers may be formed by a multi-step, sequential polymerization process, such as:
1. emulsion polymerizing a (meth)acrylate monomer charge, or at least one $C_2$–$C_{10}$ alkyl acrylate, or $C_8$–$C_{22}$ alkyl (meth)acrylate or compatible mixtures thereof, in an aqueous polymerization medium in the presence of an effective amount of a suitable di- or polyethyleneically unsaturated crosslinking agent for such monomers, with the $C_4$–$C_8$ alkyl acrylates being the preferred (meth)acrylate monomers for use in this step;
2. emulsion polymerizing a monomer charge of styrene and acrylonitrile in an aqueous polymerization medium, also in the presence of an effective amount of suitable di- or polyethyleneically unsaturated crosslinking agent for such monomers, the polymerization being carried out in the presence of the product from Step 1 so that the crosslinked (meth)acrylate and crosslinked styrene-acrylonitrile components form an interpolymer wherein the respective phases surround and penetrate one another; and
3. either emulsion or suspension polymerizing a monomer charge of styrene and acrylonitrile, in the absence of a crosslinking agent, in the presence of the product resulting from step 2.

This interpolymer ASA preferably comprises about 5% to about 50%, by weight, of the above-identified alkyl (meth) acrylate component, about 5% to about 35%, by weight, of the crosslinked styrene-acrylonitrile component and about 15% to about 90%, by weight, of the uncrosslinked styrene acrylonitrile components.

Another example of ASA polymeric materials useful in the present compositions is in the form of one or more terpolymers. Examples of such terpolymers are disclosed in Morinaga et al U.S. Pat. No. 4,151,226. The ASA terpolymers disclosed in this patent are prepared by graft copolymerizing in the presence of a water soluble polymer and a radical polymerization initiator in an aqueous medium, about 60 to about 90 parts by weight of a monomer mixture comprising about 30% to about 100% by weight of an aromatic vinyl compound, such as styrene, and 0 to 70% by weight of a component about 20% to about 100% by weight acrylonitrile with the remainder being methylmethacrylate. This monomer mixture is polymerized in the presence of 10 to 40 parts by weight (in terms of solids content) of a rubbery copolymer latex obtained by copolymerizing in an aqueous emulsion a mixture comprising (1) about 60% to about 99.9% by weight of at least one alkyl acrylate, such as butyl acrylate, having 1 to about 13 carbon atoms in the alkyl group, (2) about 0 to about 20% by weight of at least one vinyl compound copolymerizable with (1), such as styrene, and (3) about 0.1 to about 20 percent by weight of at least one organic polyallyl compound copolymerizable with (1), such as triallyl isocyanurate. In the polymerization process, the reaction system is subjected to a mechanical mixing treatment by means of, for example, an ordinary agitator, homogenizer or colloid mill, and then the graft copolymerization is conducted.

The present compositions may further comprise effective amounts of one or more of the following additives: glassy amorphous polymer, acrylic copolymer, styrene acrylonitrile copolymer, vinyl chloride polymer, antioxidants, lubricants, ultraviolet light stabilizers, thermal stabilizers, impact modifiers, for example, ethylene-containing materials such as ethylene/propylene-containing polymeric materials, ethylene/acrylate and/or methacrylate ((meth)acrylate)-containing polymeric materials, for example, as described in Wefer U.S. Pat. No. 4,780,506 and Kamins U.S. Pat. Nos. 4,985,497 and 5,086,113, pigments, such as titanium dioxide, and the like additives. The disclosure of each of the above-noted Wefer and Kamins patents is incorporated in its entirety herein by reference. Effective amounts of one or more of such additives can advantageously be included in the present compositions.

In another broad aspect of the present invention, methods for forming weatherable compositions are provided. Such methods comprise providing an acrylonitrile/styrene/acrylic polymeric material, as described elsewhere herein; providing a wood component; and forming a substantially uniform physical blend or mixture of the acrylonitrile/styrene/acrylic polymeric material and the wood component.

The present forming step preferably includes subjecting the mixture of the acrylonitrile/styrene/acrylic polymeric material and the wood component to conditions effective to produce a substantially uniform, flowable or extrudable composition. Such conditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

Any and all features described herein and combinations of such features are included within the scope of the present invention provided that the features of any such combination are not mutually inconsistent.

These and other aspects of the present invention are apparent in the following detailed description of the invention.

DETAILED DESCRIPTION

The present compositions can be used to form weatherable, impact resistant articles. For example, the present compositions, alone or in combination, e.g., as a composite, laminate and the like, with one or more other materials can be used to produce articles, such as window coverings, house sidings, and other articles which are resistant to the effects of outdoor weather on a long term basis and, therefore, can be employed out-of-doors. The present compositions can be molded, extruded and/or otherwise formed into shapes and configurations useful in producing such finished product articles. Such finished product articles can include only the compositions of the present invention or can be composites or other combinations of the present compositions with other materials.

In one aspect of the present invention, compositions are provided which comprise substantially uniform blends of uncross-linked acrylonitrile/styrene copolymers, acrylic copolymer (hereinafter cross-linked alkyl acrylate/graft (meth)acrylate copolymers) and filler component, preferably wood. The composition, in one embodiment, includes at least about 30% by weight, based on the total weight of the above-noted copolymers of an uncross-linked acrylonitrile/styrene copolymer and at least about 5% by weight, based on the total weight of the above-noted copolymers, of the cross-linked alkyl acrylate/graft (meth)acrylate copolymer. The wood component is present in an amount effective as a filler in the final composition. The specific amount of wood component included is often similar or on the same order as the amount of such components used as fillers in conventional ASA or other polymeric materials. More preferably, the acrylonitrile/styrene copolymer is present in an amount in the range of about 30% to about 95% by weight, based on the total weight of the copolymers, and the cross-linked alkyl acrylate/graft (meth)acrylate copolymer is present in an amount in the range of about 5% to about 70% by weight, based on the total weight of the copolymers.

The uncross-linked acrylonitrile/styrene copolymers useful in the present invention preferably have an acrylonitrile content in the range of about 20% to about 40% by weight, and a styrene content in the range of about 60% to about 80% by weight.

The uncross-linked acrylonitrile/styrene copolymer component can be produced by polymerization, e.g., emulsion or suspension polymerization, of a mixture of acrylonitrile and styrene. See, for example, Yu et al U.S. Pat. No. 3,944,631.

Emulsion polymerization is carried out by adding the acrylonitrile-styrene charge to an aqueous emulsion.

If desired, minor amounts, e.g., below about 20% by weight, of optional monomers can be included. Examples of such optional monomers are t-butyl styrene, p-chlorostyrene, alpha-methyl styrene, methyl methacrylate, alkyl acrylate, vinylidene chloride, ethylene, propylene, isobutylene and/or other ethylenically unsaturated compounds copolymerizable with acrylonitrile and styrene. Preferably, the only significant or substantial monomers used are acrylonitrile and styrene.

Emulsifiers, initiators and chain transfer agents can be used in effective amounts to provide the desired result or benefit during the acrylonitrile-styrene polymerization.

The emulsifier which may be used is at least one of the following conventional types: an anionic emulsifier, e.g., the $C_2$–$C_{22}$ carboxylic acids, the sulfates or, sulfonates, of $C_6$–$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier preferably is present in an amount in a range of about 0.5% to about 5% by weight in the emulsion.

An initiator preferably is present in the emulsion in an amount in a range of about 0.005% to about 2% by weight of the monomer charge. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g., mixtures of peroxidic catalysts with reducing agents, such as hydazine, alkali metal bisulfites, thiosulfates, and hydrosulfites, and soluble oxidizable sulfoxyl compounds can also be used.

A chain transfer agent such as an alkyl mercaptan, e.g., t-dodecyl mercaptan, toluene, xylene, chloroform, halogenated hydrocarbons and the like may also be used.

A buffer to keep the pH at 7.0 or higher is preferably included in the emulsion.

If suspension polymerization is chosen, the suspending agent can be methyl cellulose, hydroxyethyl cellulose, hydroxypropyl cellulose, hydroxypropyl methyl cellulose, carboxymethyl cellulose, talc, clay, polyvinyl alcohol, gelatine and the like.

Other additives can be used in forming the linear acrylonitrile/styrene copolymers to confer desired properties upon the final product. Included are conventional light, thermal and ultraviolet light stabilizers, antioxidants, dyes, pigments, mineral additives and fillers and reinforcing agents, and the like.

Uncross-linked or linear acrylonitrile/styrene copolymers are commercially available. Such commercially available copolymers are useful in the present invention and, in fact, are preferred. Using such commercially available copolymers reduces the capital investment needed to commercially practice the invention. In addition, purchasing such acrylonitrile/styrene copolymers, which can be routinely analyzed using conventional techniques, eliminates the economic risk of making copolymers which do not have the desired properties. Examples of useful commercially available uncross-linked acrylonitrile/styrene copolymers include materials sold under the trademark Blendex 570 and Tyril 860 sold by GE Specialty Chemicals and Dow Chemical, respectively. A particularly useful commercially available uncross-linked, linear acrylonitrile/styrene copolymer is that sold by Bayer under the trademark Lustran, e.g., Lustran 31.

The cross-linked alkyl acrylate/graft (meth)acrylate copolymers included in the compositions of the present invention preferably are multistage elastomers comprised of a cross-linked alkyl acrylate which is graft linked to a poly (meth)acrylate, preferably polymethyl (meth)acrylate. The cross-linked alkyl acrylate/graft (meth)acrylate copolymer includes an alkyl acrylate portion present in a range of about 50% to about 95% by weight of the copolymer, and a (meth)acrylate portion present in a range of about 5% to about 50% by weight of the copolymer.

The cross-linked alkyl acrylate portion of the cross-linked alkyl acrylate/graft (meth)acrylate preferably is a copolymer containing a major proportion, that is at least 50% by weight, of alkyl and/or aralkyl acrylates, with the inclusion of about 0.05% to about 50% by weight of a polyunsaturated cross-linking comonomer and about 0% to about 10% by weight of a hydrophilic comonomer, ordinarily polymerized from an emulsion or suspension. The alkyl esters of acrylic acid have alkyl groups of 1 to about 15 carbon atoms, preferably 1 to about 8 carbon atoms. Longer chain alkyl groups may be used. Other acrylic monomers, up to about 50 weight percent, less the other inclusions, can also be used, such as aralkyl esters of acrylic acid wherein the cyclic portion contains 5, 6 or 7 carbon atoms with or without an additional alkyl bridge, and the alkyl portion of the aralkyl group containing up to about 15 carbon atoms may also be used. Substituted acrylates or methacrylates including alkylthio-alkyl acrylates such as ethyithioethyl acrylate and the like, alkoxyalkyl acrylates, such as methoxyethyl acrylate and the like, can also be used. Interpolymers with these acrylates can be based on up to about 40% by weight of one or more other addition polymerizable monomers such as styrene, alpha-methyl styrene, vinyl ethers, amides, and esters, vinyl and vinylidene halides and the like.

The (meth)acrylate portion of the cross-linked alkyl acrylate/graft (meth)acrylate copolymers may be characterized as having the majority (e.g., 50% to 100%) of alkyl (meth)acrylate units. The alkyl (meth)acrylate polymers may contain minor amounts (0 to about 40%) of non-acrylic units to provide well-known balances of physical characteristics. These polymers preferably have a heat distortion temperature greater than about 68° F., more preferably greater than about 120° F. The (meth)acrylate portion may include copolymers of about 50% to 100% alkyl methacrylate, wherein the alkyl group contains 1 to 4, preferably 1, carbon atoms, and 0% to about 50% of one or more other acrylic monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters and other substituents, and 0% to about 40% of other unsaturated monomers including vinyl esters, vinyl ethers, vinyl amides, vinyl ketones, vinyl halides, vinylidene halides, olefins and the like.

Among the hydrophilic monomers which may be included in the cross-linked alkyl acrylate/graft (meth) acrylate copolymers can be, by way of example only, hydroxy-substituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, and methacrylic acid, acrylamide, methacrylamide and the like.

Graft-linking monomers useful in producing the present cross-linked alkyl acrylate/graft (meth)acrylic copolymers, by way of example only, include allyl group containing compounds, such as allyl esters of ethylenically unsaturated acids. Most preferred are allyl acrylate, allyl methacrylate, diallyl maleate, diallyl fumarate, allyl acid itaconate and the like.

The cross-linked alkyl acrylate/graft (meth)acrylate copolymers preferably include cross-linked n-butyl acrylate-containing polymers and/or methyl methacrylate-containing polymers. In a particularly useful embodiment, the cross-linked alkyl acrylate/graft (meth)acrylate copolymer comprises a two stage polymer having a cross-linked n-butyl acrylate-based rubbery core and a second stage polymerized from methylmethacrylate alone or in combination with styrene.

Especially preferred cross-linked alkyl acrylate/graft (meth)acrylate copolymers include the core-shell polymers of the type available from Rohm & Haas Co. under the trademark Acryloid® KM330 and KM334. These components contain units derived from n-butyl acrylate, alone or in combination with a vinyl aromatic compound. Components of this type are disclosed in Owens U.S. Pat. No. 3,808,180, the disclosure of which is hereby incorporated in its entirety herein by reference.

In another aspect of the invention, the compositions comprise substantially uniform blends of interpolymer ASA and a filler component, preferably wood. The composition, in one embodiment, includes the interpolymer in a range of about 5 to 95% by weight of the composition mixture. More preferably, the composition includes the interpolymer in a range of about 25 to 40% by weight of the composition mixture. The wood component is present in an amount effective as a filler in the final composition. The specific amount of wood component included is often similar or on the same order as the amount of such components used as fillers in conventional ASA or other polymeric materials.

Interpolymer ASA of various types are available from several commercial sources. However, for a good balance of overall properties, including impact, tensile and flexural properties, it is particularly preferred that the selected ASA resin is an interpolymer (i.e. interpenetrating network) comprised of crosslinked (meth)acrylate, crosslinked styrene-acrylonitrile, and uncrosslinked styrene-acrylonitrile components. The term "interpolymer comprised of crosslinked (meth)acrylate, crosslinked styrene-acrylonitrile, and uncrosslinked styrene-acrylonitrile components" is meant to encompass the type of interpolymer composition described in Yu et al U.S. Pat. No. 3,944,631, the disclosure of which is hereby incorporated in its entirety by reference. The aforementioned alkyl acrylate, crosslinked styrene-acrylonitrile and uncrosslinked styrene-acrylonitrile polymers may be alternating copolymers, random copolymers, or block copolymers. Additionally, the alkyl acrylate polymer may also be a homopolymer. Furthermore, the crosslinked alkyl acrylate and crosslinked styrene-acrylontrile may be of the following conformations: branched, network, star, comb, ladder or semiladder.

More preferably, the interpolymer is formed by a polymerization process. Commercially available interpolymers which are formed by polymerzation include ASA/Blendex 984 (GE Specialty Chemicals), ASA/Centrex 811 (Bayer), ASA/Luran (BASF), and ASA/LI 911 (LG Chemical/Korea).

In one aspect of this invention, the interpolymer ASA is preferably formed by the polymerzation process disclosed in Yu U.S. Pat. No. 3,944,631.

Briefly, the process comprises the steps of emulsion polymerizing at least one alkyl acrylate monomer in the presence of from about 0.05% to about 10% by weight of a polyfunctional crosslinking monomer to form an aqueous latex of crosslinked acrylic elastomer particles, thereafter emulsion polymerizing a charge of styrene and acrylonitrile monomers in the presence of a crosslinking agent and the crosslinked latex particles to crosslink the styreneacrylonitrile charge, and thereafter adding a monomeric charge of styrene and acrylonitrile which does not contain a crosslinking agent but which does contain an initiator to polymerize the monomers and form a linear styrene-acrylonitrile polymer. The final product that is formed has impact and weather resistance and comprises from about 10 to 50% by weight of the crosslinked acrylic elastomer, from about 5 to about 35% by weight of the crosslinked styrene-acrylonitrile copolymer surrounding and penetrating the crosslinked acrylic elastomer, and from about 15 to 85% by weight of the polymerized linear styrenacrylonitrile.

In greater detail, now, the elastomer particles which are utilized in preparing the particles of this invention are made by means of conventional aqueous emulsion procedures as well known to those skilled in the art of using emulsifiers and water soluble catalysts.

Thus, in conducting the aqueous emulsion polymerization step leading to the preparation of these elastomer particles, there is preferably first prepared a monomer charge comprising an aqueous emulsion containing about 10 to 50%, by weight, of one or more monomers, the identity of which will be described hereinbelow, and from 0.2 to 2.0t by weight of a suitable emulsifier. From about 0.05 to 2.% by weight of the monomer mixture, of a water-soluble catalyst, such as ammonium, sodium or potassium persulfate, hydrogen peroxide or a redox system, such as a mixture of a persulfate with an alkali metal bisulfate, thiosulfate or hydrosulfite, is introduced, and the mixture is then heated at a temperature of from about 40 to 95 degree C. for a period of about 0.5 to 8 hours.

The acrylic elastomer particles used in preparing the particles of this invention comprise crosslinked acrylic polymers or copolymers having a Tg, i.e., a glass transition temperature, of less than about 25 degree C. which can be polymerized by means of free radical initiated emulsion techniques. These acrylic elastomer particles should be crosslinked so that they can retain their size and shape during subsequent polymer processing steps. This crosslinking can be achieved during the polymerization of the elastomer if a polyfunctional ethylenically unsaturated monomer is included in the polymerization recipe. As used in this disclosure, the term "crosslinked" denotes a polymer which at ambient temperatures is substantially insoluble in such organic solvents as tetrahydrofuran or cyclohexanone.

Examples of acrylic elastomer that can be used include the crosslinked polymer of the $C_2$–$C_{10}$ alkyl acrylate and the $C_8$–$C_{22}$ alkyl methacrylate monomers, preferably the $C_4$–$C_8$ alkyl acrylates, such as poly(n-butyl acrylate), poly(ethyl acrylate) and poly(2-ethylhexylacrylate). At least one acrylate monomer is utilized in this step. If desired, the monomer charge may contain small amounts, i.e., 1 to 20% by weight of the amount acrylate monomer, of optional monomers including styrene, acrylonitrile, methyl methacrylate, methacrylic acid, acrylic acid, vinylidene chloride, vinyl toluene and other ethylenically unsaturated monomer copolymerizable with the acrylate monomer selected for use.

In order to crosslink the acrylate monomer from about 0.05 to about 10% by weight (preferably 0.1 to 5%) based on the weight of acrylate monomer, of at least one crosslinking agent is used. The crosslinking agent is for the purpose of this invention a di- or polyfunctional ethylenically unsaturated monomer having at least one vinyl group of the formula:

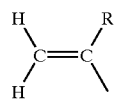

wherein R is hydrogen or lower alkyl. As is well known in the art the vinyl groups on the crosslinking monomer can be the same (e.g. dinyl benzene, trimethylol propane triacrylate, ect.) or different, (e.g., allyl methacrylate, diallyl fumarate, dially maleate, ect.) Examples of other suitable crosslinking monomers which are known to persons in the art and which can be used are 1,3-butylene dimethacrylate, diethylene glycol dimethacrylate, ethylene glycol dimethacrylate, trimethylolpropane, triethacrylate, methylene bisacrylamide, diethylene glycol diacrylate, divinyl ether, dially phthalate, divinyl sulfone, divinyl sorbitol, triethylene glycol dimethacrylate, trimethylene glycol diacrylate, butylene glycol diacrylate, pentamethylene glycol diacrylate, glyceryl triacrylate, octylene glycol diacrylate, trimethylolpropane triacrylate, the tetracrylate ester of pentaerythritol and various diallyl phoshonates.

Optimum results are obtained by the use of a crosslinked copolymer containing from about 95 to 99.9% by weight, of butylene glycol diacrylate.

The emulsifier which is used is at least one of the following conventional types: an anionic emulsifier, e.g., the $C_2$–$C_{22}$ carboxylic acids, the sulfates or, sulonates, of $C_6$–$C_{22}$ alcohols or alkyl phenols: a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier should be present from about 0.5% to about 5% by weight in the emulsion.

Moreover, in a preferred embodiment of the process of this invention, it has been found that regardless of the particular emulsifier being utilized in preparing the rubber polymer latex, its polymerization in large scale commercial equipment is greatly facilitated by introducing the monomer charge to the system in several portions over a period of from 1 to 3 hours. Thus, where this is not done and the total monomer charge is introduced in one portion, the resulting exothermic polymerization reaction often becomes virtually uncontrollable leading to overheating which, in turn, may set up, i.e., coagulate, the resulting polymer latex. However, by dividing the monomer charge and introducing it in about several portions, the resulting polymerization reaction remains controllable and overheating and coagulation can be prevented.

An initiator is also present in the emulsion in an amount ranging from about 0.005 to 2% by weight of the acrylate monomer. Suitable for use are water-soluble peroxidic compounds, e.g., hydrogen peroxide and alkali metal and ammonium persulfates, oil soluble organic peroxides and azp compounds, e.g., benzoyl peroxide, azobisisobutyronitrile and the like, used singly or in combination. Redox catalysts, e.g. mixtures of peroxidic catalysts with reducing agents, such as hydrazine, alkali metal bisulfates, thiosulfates, and hydrosulfites, and soluble oxidizable sulfoxyl compounds can also be used.

A chain transfer agent such as alkyl mercaptan, e.g., t-dodecyl mercaptan, toluene, xylene, chloroform, halogenated hydrocarbons and the like may also be used.

A buffer to keep the pH at 7.0 or higher is a final component of the emulsion.

The next step in the preferred embodiment of preparing the polymer of the present invention is the emulsion polymerization of a mixture of styrene and acrylonitrile in the presence or a minor portion of at least one di-functional or polyfunctional crosslinking monomer to form a crosslinked styrene-acrylonitrile polymer. This emulsion polymerization is carried out in the presence of the crosslinked acrylic elastomer by adding the styrene-acrylonitrile charge to the previously prepared aqueous emulsion of crosslinked acrylate elastomer. The amount of styrene-acrylonitrile which is added ranges from 5 to 35% of the weight of the final product that will be produced whereas the crosslinked acrylate elastomer is present from about 10 to 50% based upon the weight of the final product which will be formed.

The monomer charge of styrene-acrylonitrile can comprise from about 50/50 to 85/15 weight parts of styrene to acrylonitrile with the preferred ratio being 76/24. If desired, minor amounts, e.g., below about 20% by weight, of optional monomers can be included. Examples are t-butyl styrene, p-chlorostyren, alpha-methylstyrene, methyl methacrylate, alkyl acrylate, vinylidine chloride, ethylene, propylene, isobutylene and other ethylenically unsaturated compounds copolymerizable with styrene and acrylonitrile.

The crosslinking agent, emulsifier, initiators and chain transfer agents discussed in the previous step can also be used in this step in the same amounts to form the crosslinked styrene-acrylonitrile on crosslinked acrylate elastomer.

If desired, the two steps described above may be reversed in sequence.

After the emulsion polymerization of the crosslinked styrene-acrylonitrile polymer onto the crosslinked acrylic elastomer or the reverse sequence of these two steps has been accomplished, the final step of the present invention is performed. This is the formation of a linear styrene-acrylonitrile polymer which is not substantially grafted onto the crosslinked acrylic elastomer-crosslinked styrene-acrylonitrile copolymers. The amount of linear styrene-acrylonitrile polymer which is grafted is less than 30 weight percent, preferably less than 20 weight percent. This third step may be accomplished by either suspension or emulsion polymerization of charge styrene and acrylonitrile monomers having the same general composition as the styrene and acrylonitrile charge used in the previous step in the absence of a crosslinking monomer. The combined amounts of styrene and acrylonitrile utilized in this step will vary from 15–85% by weight of the final product. The same emulsifiers, initiators, chain transfer agents and optional monomers utilized in previous steps may be used in this final polymerization procedure.

If suspension polymerization is chosen the suspending agent can be methyl cellulose, hydroxyethyl cellulose, hydroxypropyl cellulose, carboxymethyl cellulose, talc, clay, polyvinyl alcohol, gelatine and the like. Preferred for this purpose is hydroxypropyl methyl cellulose which should, preferably, have a viscosity of at least about 3,000 and preferably, about 15,000 cps. as determined, at 20 degree C., with a 2%, by weight, aqueous solution of the polymer in a Ubbelohde viscometer according to ASTM Procedures D-1347 and D-2363-65T.

Other additives can be used in forming the linear styrene-acrylonitrile matrix to confer desired properties upon the final product. Included are conventional light, thermal and ultraviolet light stabilizers, antioxidants, dyes, pigments, mineral additives and fillers and reinforcing agents.

In yet another aspect of the invention, the compositions comprise substantially uniform blends of terpolymer ASA and a wood component. The amount of terpolymer ASA in a blend with wood typically can range from less than about 1% to more than about 99%, by weight.

Various types of terpolymer ASA's are available from several commercial sources. Such terpolymer ASA's are polymeric materials including units derived from styrene, and/or a derivative thereof, acrylonitrile and acrylate and/or methacrylate monomers.

Suitable terpolymer ASA's are disclosed in Morinaga et al U.S. Pat. No. 4,151,226, as described elsewhere herein.

A very useful ASA terpolymer material includes about 58.4% by weight of styrenic units, about 23.3% by weight acrylonitrile units, and about 18.3% by weight acrylate units.

The wood preferably is present in the present weatherable compositions in an amount in a range of about 0.5% to about 60% or about 70% by weight, more preferably about 1% to about 40% by weight, based on the total weight of the composition. Although the wood component may be present in any suitable form, it is preferred that the wood be present as wood particles, such as wood chips, wood flakes, sawdust, wood flour, and the like and mixtures thereof. More preferably, such particles have a size in the range of about 40 to about 200 U.S. mesh, still more preferably, about 50 to about 150 U.S. mesh.

Very useful results are obtained with the wood component being selected from pine wood, woods softer then pine wood, such as fir wood and the like and mixtures thereof. The wood component may also include a wood which is harder than pine wood, such as oak wood, walnut wood, hickory wood, maple wood and the like and mixtures thereof. One very useful combination is a wood component which includes a first wood at least as soft as pine wood and a second wood harder than pine wood. In this embodiment, the first wood preferably is present as a major amount, that is at least 50% of the total wood present, while the relatively hard wood is present in a minor amount, that is less than 50% of the total wood present. The wood component may, and preferably does, act to reinforce the present compositions.

Optionally, the compositions of this invention may further contain effective amounts of one or more additional agents, such as vinyl chloride polymer, glassy amorphous polymer, impact resistance modifiers, for example, acrylic copolymers, such as elastomers of crosslinked alkyl acrylate/graft (meth)acrylate, ethylene-containing polymeric components, such as ethylene/propylene copolymer, ethylene/(meth)acrylate copolymers and the like, as described above. Compositions of this invention may also include effective amounts of conventional pigments, processing aides, lubricants, antioxidants and stabilizers such as ultraviolet light and thermal stabilizers, and the like.

In one particularly useful embodiment, the present compositions include a vinyl chloride polymer and/or a glassy amorphous polymer. Based on the composition weight, the compositions may include ASA polymeric material from about 25% or about 30% to about 90% or more; wood component in a amount effective to provide the desired wood-like look and texture; the vinyl chloride polymer in an amount in a range of about 0% to about 50%; and/or the glassy amorphous polymer of about 0% to 40%.

The terminology "vinyl chloride polymer," as used here, is meant to encompass polyvinyl chloride homopolymers, as well as the copolymers of vinyl chloride with comonomers polymerizable therewith, with the former monomer predominating the latter in amount. Such comonomers include vinyl esters of carboxylic acids, such as vinyl acetate, the $C_1$–$C_{20}$ alkyl esters of acrylic and methacrylic acid, the aryl, halo- and nitro- substituted benzyl esters of acrylic and meth acrylic acid, the ethylenically unsaturated mono- and dicarboxylic acids, and the like.

The term "glassy amorphous polymer" as used here, is intended to encompass those resins which are non-rubber modified, non-crystalline, and have good mechanical, thermal, and hardness properties. Details regarding the structure of these polymeric materials as well as the processes for forming them are available from a number of sources. Representative polymers which are included in this class of plastics include: acrylic resins such as polymethyl methacrylate, polyethyl acrylate, polybutyl acrylate, polystyrene, and poly-alpha-methyl styrene. Copolymers of glassy amorphous polymerizable monomers are also intended to be encompassed, e.g., copolymers of styrene with methylmethacrylate or acrylonitrile. Commercially available acrylic resins include those sold under the following trademarks: Lucite (E.I. duPont de Nemours and Co.); and Plexiglas (Rohm and Haas Co.). Commercially available styrene-acrylonitrile polymers are available under the following marks: Tyril (Dow Chemical) and Lustran (Monsanto).

In another particularly useful embodiment the present compositions include an increased amount of lubricant relative to the amount of lubricant included in a similar composition without the filler, e.g., wood. Such increased amount of lubricant is effective in facilitating forming a substantially uniform physical blend of the components of the present composition, particularly, since the wood being employed is often relatively dry and/or relatively incompatible with the copolymer components of the compositions. Without wishing to limit the invention to any particular theory of operation, it is believed that the lubricant acts to wet the surface of the wood and/or to facilitate the physical mixing of the components of the present compositions. The amount of lubricant used preferably increases as the amount of wood increases. The amount of lubricant used may vary widely depending on the specific lubricant employed. The amount of lubricant employed may be in a range of about 0.1% or about 0.5% to about 2% or about 5%, by weight of the total composition.

In another broad aspect of the present invention, methods for forming weatherable compositions are provided. Such methods comprise providing an acrylonitrile/styrene/acrylate polymeric material; providing a wood component; and forming a substantially uniform physical blend of the acrylonitrile/styrene/acrylic polymeric material and the wood component.

The present forming step preferably includes subjecting the mixture of the acrylonitrile/styrene/acrylic polymeric material and the wood component to conditions effective to produce a substantially uniform, flowable or extrudable composition. Other additives may also be added. Such conditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

One particular method of the present invention for forming a weatherable composition comprises providing an uncross-linked acrylonitrile/styrene copolymer; providing a cross-linked alkyl acrylate/graft (meth)acrylate copolymer; providing filler component particles and forming a substantially uniform physical blend of these two copolymers and the filler particles. This physical blend preferably is substantially free of cross-linked acrylonitrile/styrene copolymer.

The present forming step preferably includes subjecting a mixture of uncross-linked acrylonitrile/styrene copolymer, alkyl acrylate/graft (meth)acrylate copolymer and filler component particles to conditions effective to produce a substantially uniform, flowable or extrudable composition. In one embodiment, the forming step includes extruding the substantially uniform physical composition, in particular, the substantially uniform flowable or extrudable composition.

Blending of the formulation of the present invention can be achieved by any of the well-known polymer blending techniques, such as two-roll or Banbury mixing, single or multiple screw extrusion, or any other method which applies sufficient heat (temperature) and/or pressure and/or shear (mixing) to the ingredients to obtain an uniform blend. Typical temperatures are in a range of about 300° F. or about 325° F. to about 450° F. or about 475° F., while typical elevated pressures are in a range of about 750 psi or about 1000 psi to about 2000 psi or more. At such temperatures and/or pressures, the shear or mixing force typically generated in the above-noted mixing or extrusion systems is sufficient to obtain the desired, substantially uniform blend.

The substantially uniform blend formed preferably includes at least about 30% by weight, based on the total weight of the copolymers present, of the uncross-linked acrylonitrile/styrene copolymer and at least about 5% by weight, based on the total weight of the copolymers present, of the cross-linked alkyl acrylate/graft (meth)acrylate copolymer and an amount of filler component particles effective as a filler in the final composition. More preferably, the uncross-linked acrylonitrile/styrene copolymer is present in an amount in a range of about 30% to about 95% by weight based on the total weight of the copolymer and the cross-linked alkyl acrylate/graft (meth)acrylate copolymer is present in an amount in a range of about 5% to about 70% by weight based on the total weight of the copolymers. It is preferred that, during the forming step, substantially no polymerization occurs.

The following non-limiting examples illustrate certain advantages of the present invention.

EXAMPLES 1 AND 2

The following formulations are prepared by combining the listed ingredients:

|  | Example 1 wt % | Example 2 wt % |
| --- | --- | --- |
| Uncross-linked, linear acrylonitrile/styrene copolymers[1] | 75.88 | 66.88 |
| Cross-linked n-butyl acrylate/ graft methyl (meth)acrylate copolymer[2] | 22.38 | 31.59 |
| Lubricant[3] | 1.15 | 1.00 |
| Stabilizer[4] | 0.15 | 0.13 |
| Light stabilizer[4] | 0.30 | 0.27 |
| Antioxidant[4] | 0.15 | 0.13 |

[1]Sold by Bayer under the trademark Lustran 31 (contains about 23% by weight of acrylonitrile).
[2]Sold by Rohm & Haas Co. under the trademark Acryloid KM334, n-butyl acrylate/butylene glycol diacrylate/methyl methacrylate/alkylacrylate
[3]Sold by Struktol Corporation under the trademark TR-251, metal stearate/amide composition effective as lubricant.
[4]Well known, commercially available component.

EXAMPLES 3 AND 4

The following formulations are prepared by combining the listed ingredients.

|  | Example 3 wt % | Example 4 wt % |
| --- | --- | --- |
| Uncross-linked, linear acrylonitrile/styrene copolymers[1] | 69.5 | 61.6 |
| Cross-linked n-butyl acrylate/ graft methyl (meth)acrylate copolymer[2] | 20.4 | 28.6 |

-continued

|  | Example 3 wt % | Example 4 wt % |
|---|---|---|
| Wood Particles[5] | 8.0 | 8.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[1], [2], [3] and [4] are shown in Examples 1 and 2.
[5] 100 U. S. Mesh pine wood flour.

Each of these formulations of Example 1 to 4 is thoroughly mixed at elevated temperatures of about 400° F.–450° F. (which is the melt temperature range of the copolymer combinations in these formulations) to form a substantially uniform, extrudable composition.

EXAMPLES 5 TO 8

Each of the compositions that is produced in Examples 1 to 4 is successfully formed into pellets using a Cincinnati Milacron Model CM-80 conical twin screw extruder and a Beringer Water Ring Pelletizer. In each, the following conditions are employed.

| Barrel Zone 1 | 325° F. |
|---|---|
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365° F. |
| Die Zone 4 | 375° F. |
| Die Zone 5 | 375° F. |
| Screw Oil | 350° F. |
| Motor, RPM | 2000 |
| Motor Load, amps | 110 |

EXAMPLES 9 AND 12

A sample of the pellets produced in each of Examples 5 to 8 is successfully extruded as a cap material over a rigid acrylonitrile/butadiene/styrene (ABS) foam material using a 1.75 inch, 24:1 L/D Akron extruder. The following conditions are used:

| Barrel Zone 1 | 310° F. |
|---|---|
| Barrel Zone 2 | 330° F. |
| Barrel Zone 3 | 350° F. |
| Die Zone 1 | 360° F. |
| Die Zone 2 | 360° F. |
| Capping Head | 360° F. |
| Screw, RPM | 24 |
| Motor Load, amps | 18 |

The pellets and capped ABS articles produced in the Examples are found to have sufficient weatherability to be used out-of-doors on a long term basis.

EXAMPLES 13 AND 14

The following formulations are prepared by combining the listed ingredients.

|  | Example 13 wt % | Example 14 wt % |
|---|---|---|
| acrylonitrile/styrene/acrylic (ASA) interpolymer | 54.9[6] | 55.2[7] |
| Wood Particles[5] | 43.0 | 43.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[3] and [4] are shown in Examples 1 and 2.
[5] 100 U. S. Mesh pine wood flour.
[6] ASA, Blendex 984. Sold by GE Specialty Chemicals.
[7] ASA, Centrex 811. Sold by Bayer.

EXAMPLES 15 AND 16

The following formulations are prepared by combining the listed ingredients.

|  | Example 15 wt % | Example 16 wt % |
|---|---|---|
| acrylonitrile/styrene/acrylic (ASA) interpolymer[6] | 50.0 | 45.0 |
| Wood Particles[5] | 8.2 | 3.4 |
| Glassy amorphous polymer[8] | 20.0 | 30.0 |
| Vinyl chloride polymer[9] | 0.0 | 20.0 |
| Acrylic copolymer[2] | 20.0 | 0.0 |
| Lubricant[3] | 1.5 | 1.3 |
| Stabilizer[4] | 0.15 | 0.13 |
| Light stabilizer[4] | 0.30 | 0.27 |
| Antioxidant[4] | 0.15 | 0.13 |

[2], [3] and [4] are shown in Examples 1 and 2.
[5] 100 U. S. Mesh pine wood flour.
[6] ASA, Blendex 984. Sold by GE Specialty Chemicals.
[8] Lucite 147K brand (E.I. duPont de Nemours and Co.)
[9] Geon 103 EPR-76 brand Each of these formulations produced in Examples 13 to 16 is thoroughly mixed at elevated temperatures of about 400° F.–450° F. (which is the melt temperature range of these formulations) to form a substantially uniform, extrudable composition.

EXAMPLES 17 TO 20

Each of the compositions that is produced in Examples 13 to 16 is successfully formed into pellets using a Cincinnati Milacron Model CM-80 conical twin screw extruder and a Beringer Water Ring Pelletizer. In each, the following conditions are employed.

| Barrel Zone 1 | 325° F. |
|---|---|
| Barrel Zone 2 | 325° F. |
| Barrel Zone 3 | 365° F. |
| Barrel Zone 4 | 365° F. |
| Adaptor Zone 1 | 365° F. |
| Adaptor Zone 2 | 365° F. |
| Screenchanger Zone 3 | 365° F. |
| Die Zone 4 | 375° F. |
| Die Zone 5 | 375° F. |
| Screw Oil | 350° F. |
| Motor, RPM | 2000 |
| Motor Load, amps | 110 |

EXAMPLES 21 AND 24

A sample of the pellets produced in each of Examples 17 to 20 is successfully extruded as a cap material over a rigid acrylonitrile/butadiene/styrene (ABS) foam material using a 1.75 inch, 24:1 L/D Akron extruder. The following conditions are used:

| Barrel Zone 1 | 310° F. |
|---|---|
| Barrel Zone 2 | 330° F. |
| Barrel Zone 3 | 350° F. |
| Die Zone 1 | 360° F. |
| Die Zone 2 | 360° F. |
| Capping Head | 360° F. |
| Screw, RPM | 24 |
| Motor Load, amps | 18 |

The pellets and capped ABS articles produced in the Examples are found to have sufficient weatherability to be used out-of-doors on a long term basis.

While this invention has been described with respect to various specific examples and embodiments, it is to be understood that the invention is not limited thereto and that it can be variously practiced within the scope of the following claims.

What is claimed is:

1. A weatherable composition comprising an acrylonitrile/styrene/acrylic polymeric material, an acrylic copolymer comprising a cross-linked alkyl acrylate/graft (meth)acrylate copolymer, the acrylate copolymer being present in an amount effective to enhance the impact resistance of the weatherable composition relative to a substantially identical composition without the acrylic copolymer, and a wood component in an amount effective as a filler in the weatherable composition.

2. The weatherable composition of claim 1 wherein the acrylonitrile/styrene/acrylic polymeric material includes an interpolymer.

3. The weatherable composition of claim 2 wherein the interpolymer is formed by an emulsion polymerization process.

4. The weatherable composition of claim 2 wherein the interpolymer is formed from styrene, acrylonitrile and at least one component selected from the group consisting of acrylates, methacrylates and mixtures thereof.

5. The weatherable composition of claim 1 wherein the acrylonitrile/styrene/acrylic polymeric material includes a terpolymer.

6. The weatherable composition of claim 5 wherein the terpolymer includes units derived from styrene, acrylonitrile and at least one component selected from the group consisting of acrylates, methacrylates and mixtures thereof.

7. The weatherable composition of claim 1 wherein the wood component is present as particles having a size in a range of about 40 to about 200 U.S. mesh.

8. The weatherable composition of claim 1 wherein the wood is selected from the group consisting of pine wood, woods softer than pine wood and mixtures thereof.

9. The weatherable composition of claim 1 wherein the wood component includes a first wood at least as soft as pine wood and a second wood harder than pine wood.

10. The weatherable composition of claim 1 wherein the wood component is present in a form selected from the group consisting of wood chips, wood flakes, sawdust, wood flour and mixtures thereof.

11. The weatherable composition of claim 1 wherein the cross-linked alkyl acrylate/graft (meth)acrylate copolymer includes cross-linked n-butyl acrylate-containing copolymer and methyl methacrylate-containing polymer.

12. The weatherable composition of claim 1 which further comprises an effective amount of a lubricant.

13. The weatherable composition in claim 1 which further comprises a vinyl chloride polymer in an amount effective to enhance the flame retardancy of the composition relative to a substantially identical composition without the vinyl chloride polymer.

14. A method for forming a weatherable composition comprising:
    (1) providing an acrylonitrile/styrene/acrylic polymeric material;
    (2) providing an acrylic copolymer comprising a cross-linked alkyl acrylate/graft (meth)acrylate copolymer;
    (3) providing a wood component; and
    (4) forming a weatherable composition of a substantially uniform physical mixture including said acrylonitrile/styrene/acrylic polymeric material, said acrylic copolymer, and said wood component, said acrylic copolymer being present in an amount effective to enhance the impact resistance of the weatherable composition relative to a substantially identical composition without the acrylic copolymer.

15. The method of claim 14 wherein step (1) includes providing an interpolymer.

16. The method of claim 14 wherein step (1) includes providing a terpolymer.

17. The method of claim 14 wherein the step (3) includes providing the wood component as wood particles.

18. A weatherable composition comprising an acrylonitrile/styrene/acrylic interpenetrating interpolymer comprised of a crosslinked (meth)acrylate component, a crosslinked styrene-acrylonitrile component and an uncrosslinked styrene-acrylonitrile component, and a wood component in an amount effective as a filler in the weatherable composition.

19. The weatherable composition of claim 18 wherein the interpolymer is formed by an emulsion polymerization process.

20. The weatherable composition of claim 18 wherein the interpolymer is formed from styrene, acrylonitrile and at least one component selected from the group consisting of acrylates, methacrylates and mixtures thereof.

21. The weatherable composition of claim 18 wherein the wood component is present as particles having a size in a range of about 40 to about 200 U.S. mesh.

22. The weatherable composition of claim 18 wherein the wood is selected from the group consisting of pine wood, woods softer than pine wood and mixtures thereof.

23. The weatherable composition of claim 18 wherein the wood component includes a first wood at least as soft as pine wood and a second wood harder than pine wood.

24. The weatherable composition of claim 18 wherein the wood component is present in a form selected from the group consisting of wood chips, wood flakes, sawdust, wood flour and mixtures thereof.

25. The weatherable composition in claim 18 which further comprises an acrylic copolymer in an amount effective to the enhance the impact resistance of the composition relative to a substantially identical composition without the acrylic copolymer.

26. The weatherable composition in claim 25 wherein the acrylic copolymer comprises a crossed-linked alkyl acrylate/graft (meth)acrylate copolymer.

27. The weatherable composition of claim 26 wherein the cross-linked alkyl acrylate/graft (meth)acrylate copolymer includes cross-linked n-butyl acrylate-containing copolymer and methyl methacrylate-containing polymer.

28. The weatherable composition of claim 18 which further comprises an effective amount of a lubricant.

29. The weatherable composition in claim 18 which further comprises a vinyl chloride polymer in an amount effective to enhance the flame retardancy of the composition relative to a substantially identical composition without the vinyl chloride polymer.

30. A method for forming a weatherable composition comprising:
   (1) providing an acrylonitrile/styrene/acrylic interpenetrating interpolymer comprised of a crosslinked (meth) acrylate component, a crosslinked styrene-acrylonitrile component and an uncrosslinked styrene acrylonitrile component;
   (2) providing a wood component; and
   (3) forming a substantially uniform physical mixture including said acrylonitrile/styrene/acrylic interpolymer and said wood component.

31. The method of claim 30 wherein the step (2) includes providing the wood component as wood particles.

\* \* \* \* \*